(12) United States Patent
Woo et al.

(10) Patent No.: US 7,971,216 B2
(45) Date of Patent: Jun. 28, 2011

(54) METHOD OF DISPLAYING BROADCAST CHANNEL INFORMATION AND BROADCAST RECEIVER IMPLEMENTING THE SAME

(75) Inventors: Sung Ho Woo, Gyeonggi-do (KR); Jae Do Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 11/853,553

(22) Filed: Sep. 11, 2007

(65) Prior Publication Data

US 2008/0222677 A1 Sep. 11, 2008

(30) Foreign Application Priority Data

Mar. 9, 2007 (KR) .................. 10-2007-0023404

(51) Int. Cl.
G06F 3/00 (2006.01)
G06F 13/00 (2006.01)
H04N 5/445 (2006.01)
(52) U.S. Cl. ......................................................... 725/39
(58) Field of Classification Search ............... 725/39–55
See application file for complete search history.

(56) References Cited

U.S. PATENT DOCUMENTS

| 6,005,562 | A | 12/1999 | Shiga et al. | |
|---|---|---|---|---|
| 6,057,831 | A | 5/2000 | Harms et al. | |
| 7,404,142 | B1 * | 7/2008 | Tischer | 715/247 |
| 2005/0154997 | A1 * | 7/2005 | Brun-Cottan et al. | 715/805 |
| 2008/0127269 | A1 * | 5/2008 | Chicles | 725/44 |
| 2009/0193349 | A1 * | 7/2009 | Arav | 715/764 |

FOREIGN PATENT DOCUMENTS

| CA | 2 596 742 | 7/2007 |
|---|---|---|
| KR | 10-2001-0052396 A | 6/2001 |
| KR | 2001-0052396 A | 6/2001 |
| WO | WO-03/088027 A1 | 10/2003 |

OTHER PUBLICATIONS

MixPad Web Page (Archived Aug. 5, 2006). http://web.archive.org/web/20060805185858/nch.com.au/mixpad/index.html Accessed Aug. 12, 2009.*
"Interaction Design Guide for Touchscreen Applications." Jan. 22, 2003. Accessed Jan. 24, 2010. http://www.sapdesignguild.org/resources/TSDesignGL/TSDesignGL.pdf.*

* cited by examiner

*Primary Examiner* — Scott Beliveau
*Assistant Examiner* — Bennett Ingvoldstad
(74) *Attorney, Agent, or Firm* — Birch, Stewart, Kolasch & Birch, LLP

(57) ABSTRACT

A method of displaying broadcast channel information on a broadcast terminal. The method includes touching a pointer at a first position on a touch screen of the broadcast terminal and then dragging the pointer to a second position on the touch screen, and displaying information about broadcast channels respectively assigned in advance to the first and second positions while the pointer is dragged from the first position to the second position.

19 Claims, 8 Drawing Sheets

(2-1)

(2-2)

(2-3)

(2-4)

(2-5)

(3-1)

(3-2)

(3-3)

(3-4)                (3-5)

(5-1)

(5-2)

(5-3)

(6-1)

(6-2)

(6-3)

(6-4)

(7-1)

(7-2)

(7-3)

(7-4)

(8-1)

(8-2)

(8-3)

METHOD OF DISPLAYING BROADCAST CHANNEL INFORMATION AND BROADCAST RECEIVER IMPLEMENTING THE SAME

This application claims priority to Korean Patent Application No. 10-20070023404, filed in Korea on Mar. 9, 2007, which is hereby incorporated by reference in its entirety.

BACKGROUND OF THE INVENTION

1. Field of the Invention

The present invention relates to a broadcast receiving terminal, and more particularly, to a method and corresponding broadcast terminal for displaying broadcast channel information.

2. Discussion of the Related Art

Mobile terminals are now being considered a necessity. Further, mobile terminals now provide many features in addition to a standard calling service. For example, various programs (e.g., movies, television shows, sporting events, audio programs, etc.) are being broadcast to mobile terminals.

However, because the mobile terminal is compact, the user has to use various menu options provided on the terminal to view or see information about a particular broadcasting program. Thus, it is not easy to view information about a particular program among a plurality of broadcast channels currently being transmitted.

SUMMARY OF THE INVENTION

Accordingly, one object of the present invention is to address the above-noted and other problems.

Another object of the present invention is to provide a method and corresponding broadcast terminal that displays channel information as the user drags a pointer from one position to another position along a touch screen of the terminal.

To achieve these objects and other advantages and in accordance with the purpose of the invention, as embodied and broadly described herein, the present invention provides in one aspect a method of displaying broadcast channel information on a broadcast terminal. The method includes touching a pointer at a first position on a touch screen and then dragging the pointer to a second position on the touch screen, and displaying information about broadcast channels respectively assigned in advance to the first and second positions while the pointer is dragged from the first position to the second position.

In another aspect, the present invention provides a broadcast terminal, which includes a broadcasting receiving unit configured to receive a plurality of broadcast channels, a display unit including a touch screen configured to be touched by a user to input information into the broadcast terminal and to display information, and a control unit configured to determine when a pointer is touched at a first position on the touch screen and then dragged to a second position on the touch screen, and to display on the display unit information about broadcast channels respectively assigned in advance to the first and second positions while the pointer is dragged from the first position to the second position.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, the present invention is applicable to any type of a terminal capable of receiving broadcasts such as a mobile terminal, a PDA (personal digital assistant), a game player, a broadcast receiving terminal, etc. However, the following description will refer to a mobile terminal that is capable of receiving broadcast information.

Figure 1:
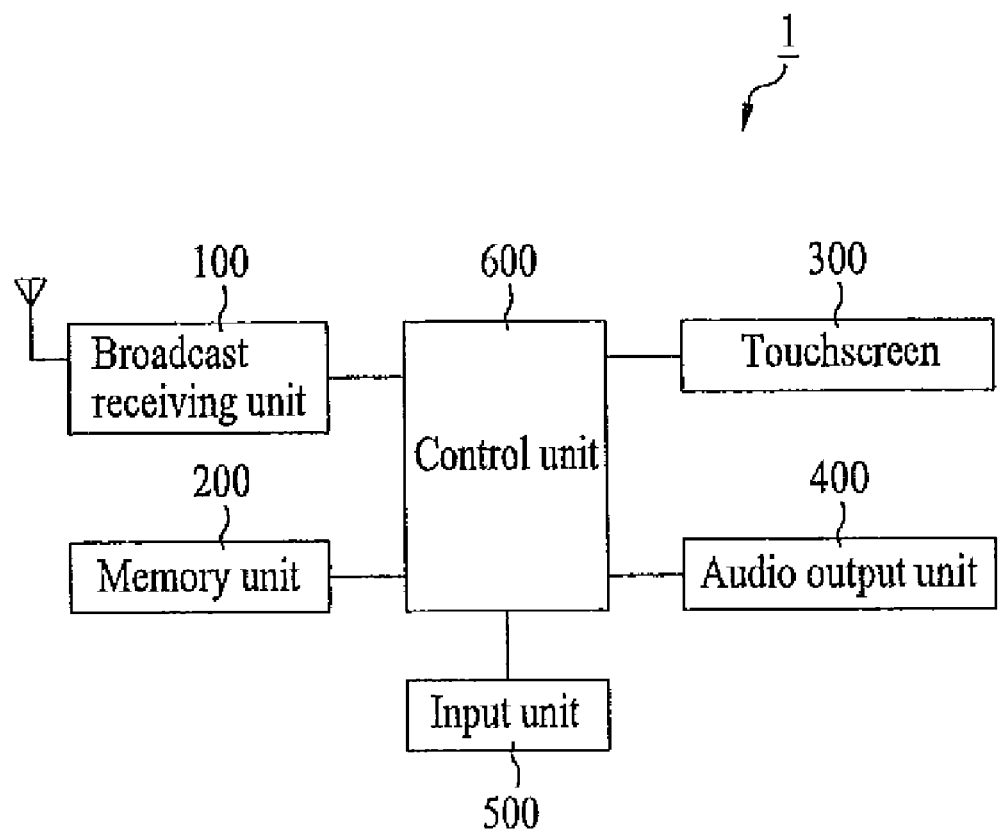
FIG. 1 is a block diagram of a mobile terminal according to an embodiment of the present invention.

Turning first to FIG. 1, which is a block diagram illustrating a mobile terminal 1 according to an embodiment of the present invention. As shown, the mobile terminal 1 includes a broadcast receiving unit 100, a memory unit 200, a touch screen 300, an audio output unit 400, an input unit 500, and a control unit 600. The mobile terminal 1 also includes other elements such as a mobile communication transceiving unit, etc. However, because the additional elements are not directly associated with the present invention, a detailed explanation of these additional elements will be omitted in the following description.

A detailed description of the elements in FIG. 1 will now be given. In more detail, the broadcast receiving unit 100 preferably receives various broadcasts transmitted with a broadcast program guide. That is, information is broadcast to a plurality of terminals via terrestrial DTV, satellite DTV, etc. The information may also be broadcast via mobile broadcasting networks such as the U.S. MediaFlo, Korean DMV, (digital multimedia broadcasting), and European DVB-H systems.

In addition, the broadcast program guide is a program guide containing channel program information carried via the broadcasting network. In particular, the broadcast program guide includes the EPG (electronic program guide) in the broadcasting standard of D-TV, DMB (digital multimedia broadcasting), etc. and the ESG (electronic service guide) in the broadcasting standard of DVB (digital video broadcasting), etc. That is, the broadcasting program guide includes information that may be displayed to a user about a particular broadcast.

In addition, the memory unit 200 stores various types of software and/or data required for operating the mobile terminal 1. Further, the touch screen 300 functions as both a display and input unit. That is, the touch screen 300 displays a real-time operational status of the mobile terminal 1 or an image according to each function provided by the mobile terminal 1. In addition, the touch screen 300 can also be used as an input unit to input information or particular commands. The touch screen 300 also displays a broadcasted program received via the broadcast receiving unit 100.

Further, the touch screen 300 can be an electrostatic capacitive type, a resistive overlay type, an infrared beam type, a surface acoustic wave type, an integral strain gauge type, a piezoelectric type, etc. In addition, the audio output unit 400 outputs various audio signals of the mobile terminal 1. Specifically, the audio output unit 400 outputs audio of a broadcasted program received via the broadcast receiving unit 100.

Also, the input unit 500 allows the user to input various commands or information into the mobile terminal 1. Thus, the touch screen 300 and the input unit 500 can be used to input information into the terminal 1. Further, in some instances, the touch screen 300 can be used to input all information into the terminal 1, and thus, the input unit 500 can be omitted.

Further, the control unit 500 controls the overall operation of the terminal 1 by controlling the broadcast receiving unit 100, the memory unit 200, the touch screen 300, the audio output unit 400, and the input unit 500. The control unit 600 also performs the method of the present invention in conjunction with the other elements of the terminal 1.

Figure 2:
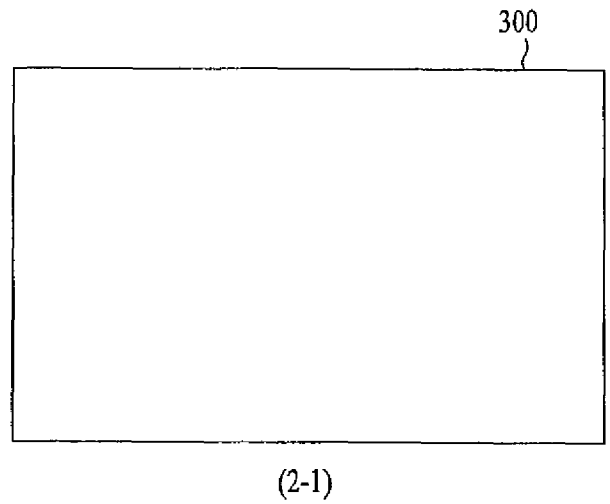
FIG. 2 is an overview of a touch screen of a mobile terminal that is displaying broadcast channel information according to an embodiment of the present invention.
Figure 2:
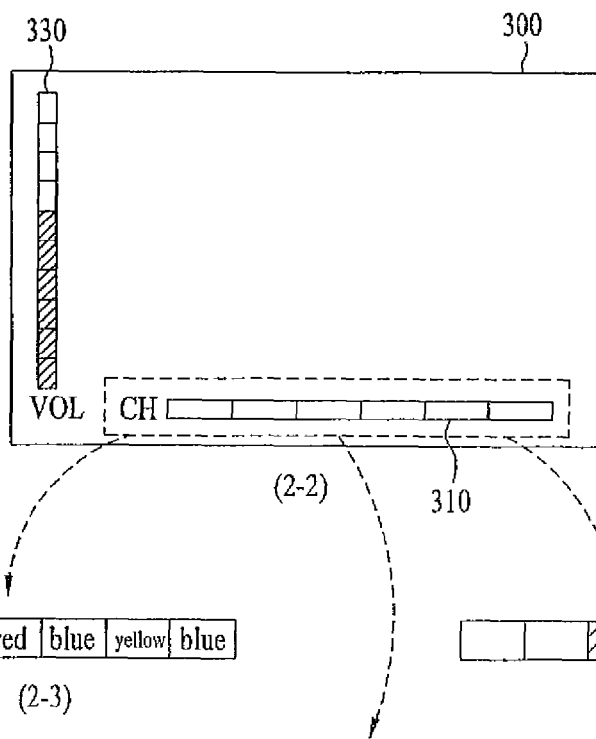
Figure 2:
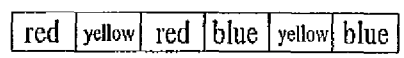
Figure 2:
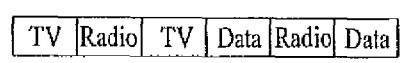
Figure 2:

Turning now to FIG. 2, which is an overview of a touch screen on a mobile terminal that is displaying broadcast channel information according to an embodiment of the present invention.

Referring to (2-1) of FIG. 2, the mobile terminal 1 plays a received broadcast program via the touch screen 300. As shown in (2-2) of FIG. 2, when the user touches the touch screen 300, a broadcasting part 310 and a volume part 330 are displayed on the touch screen. The broadcasting part 310 includes a plurality of broadcasting channels and the volume part 330 displays a current volume of the broadcasted program (the user can also adjust the volume by dragging a pointer up or down on the volume part 330).

In addition, the broadcast channel part 310 and the volume part 330 can be automatically displayed on the touch screen 300 when the broadcasting program is being displayed (i.e., rather than activating the volume part 330 and the broadcast channel part 310 when the user touches the touch screen 300). Alternatively, the parts 310 and 330 can be activated via a command entered on the input unit 500.

The broadcast channel part 310 and the volume part 330 can have various shapes and configurations. In the following description, the broadcast channel part 310 and the volume part 330 have bar shapes as shown in FIG. 2. Accordingly, the broadcast channel part 310 and the volume part 330 are also referred to as a broadcast channel bar 310 and a volume bar 330, respectively.

In addition, the broadcast channel bar 310 and the volume bar 330 do not necessarily have to be activated together. That is, the bars 310 and 330 may be displayed individually when the user inputs a specific command. Further, the broadcast channel bar can be arranged in a different direction that in the horizontal direction as shown in FIG. 2. That is, the broadcast channel bar 310 (and volume bar 330) can be arranged in any direction on the touch screen 300.

In addition, it is also possible not to display the channel bar 310 on the touch screen 300. In this instance, the user can still drag a pointer across a portion of the touch screen 300 to display the various channel information. Also, the channel bar 310 (and volume bar 330) can be hidden when the user is not touching the touch screen 300 and displayed when the user touches the touch screen 300 at the respective positions of the bars 310 and 330.

In addition, as shown in (2-2) of FIG. 2, a plurality of broadcast channels are assigned to equal sections on the broadcast channel bar 310. That is, in (2-2) of FIG. 2, the equal sections are visually discriminated from one another on the broadcast channel bar 310. However, the different sections do not necessarily have to be discriminated from each other. Further, the assigned broadcast channels include all broadcast channels receivable by the mobile terminal 1 or broadcast channels selected in advance according to a terminal user's taste.

In addition, as shown in (2-3) of FIG. 2, TV broadcast channels, radio broadcast channels, and data broadcast channels can be randomly assigned to the broadcast channel bar 310. In this embodiment, the different broadcast channels are discriminated from each other by using different colors. In particular, in the broadcast channel bar 310 shown in (2-2) of FIG. 2, the section corresponding to the TV broadcast channel is represented as a red color, the section corresponding to the radio broadcast channel is represented as a yellow color, and the section corresponding to the data broadcast channel is represented as a blue color, for example.

Alternatively, as shown in (2-4) of FIG. 2, a title of the corresponding channel can be displayed in each section (e.g., the section corresponding to the TV broadcast channel is labeled 'TV', the section corresponding to the radio broadcast channel is labeled 'Radio', and the section corresponding to the data broadcast channel is labeled 'Data'). Further, as shown in (2-5) of FIG. 2, a currently received and reproduced broadcast channel can be visually discriminated in the broadcast channel bar 310.

In addition, the activated broadcast bar 310 and/or the volume bar 330 can be deactivated if the touch screen 300 is re-touched, a command is inputted via the input unit 500, or a broadcast channel switching operation is completed.

Turning now to an explanation of different embodiments of a method of displaying information about broadcast channels/programs according to embodiments of the present invention.

First Embodiment

Figure 3:
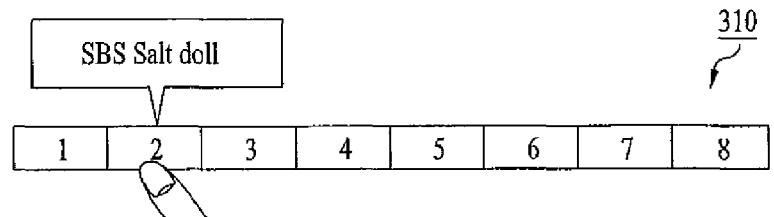
FIG. 3 is an overview of a channel part including a plurality of broadcast channels displayed on a touch screen of a mobile terminal according to a first embodiment of the present invention.
Figure 3:
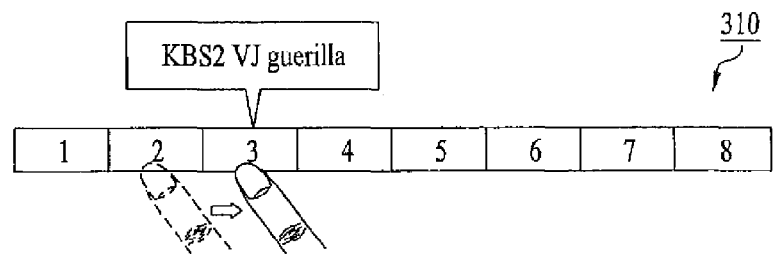
Figure 3:
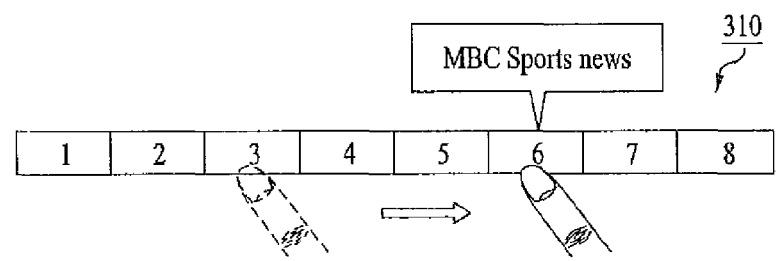
Figure 3:
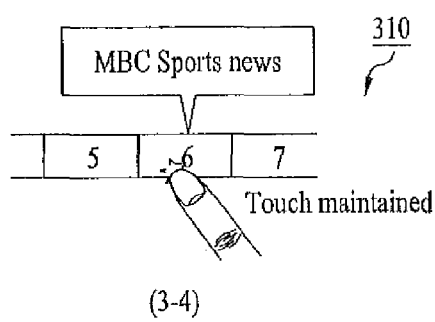
Figure 3:
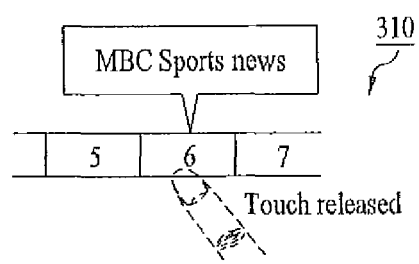

FIG. 3 is an overview of a channel part including a plurality of broadcast channels displayed on a touch screen of a mobile terminal according to the first embodiment of the present invention. As shown in FIG. 3, the broadcast channel bar 310 includes a plurality of broadcast channels that are visually discriminated from one another by using consecutive numerals. Other methods may also be used.

As shown in FIG. 3, the user touches a pointer (e.g., his or her finger) at a first position on a touch screen (see (3-1) of FIG. 3) and then drags the pointer to a second position on the touch screen (see (3-2) of FIG. 3). Further, information about broadcast channels respectively assigned in advance to the first and second positions is displayed while the pointer is dragged from the first position to the second position. See also (3-3) of FIG. 3.

Figure 4:
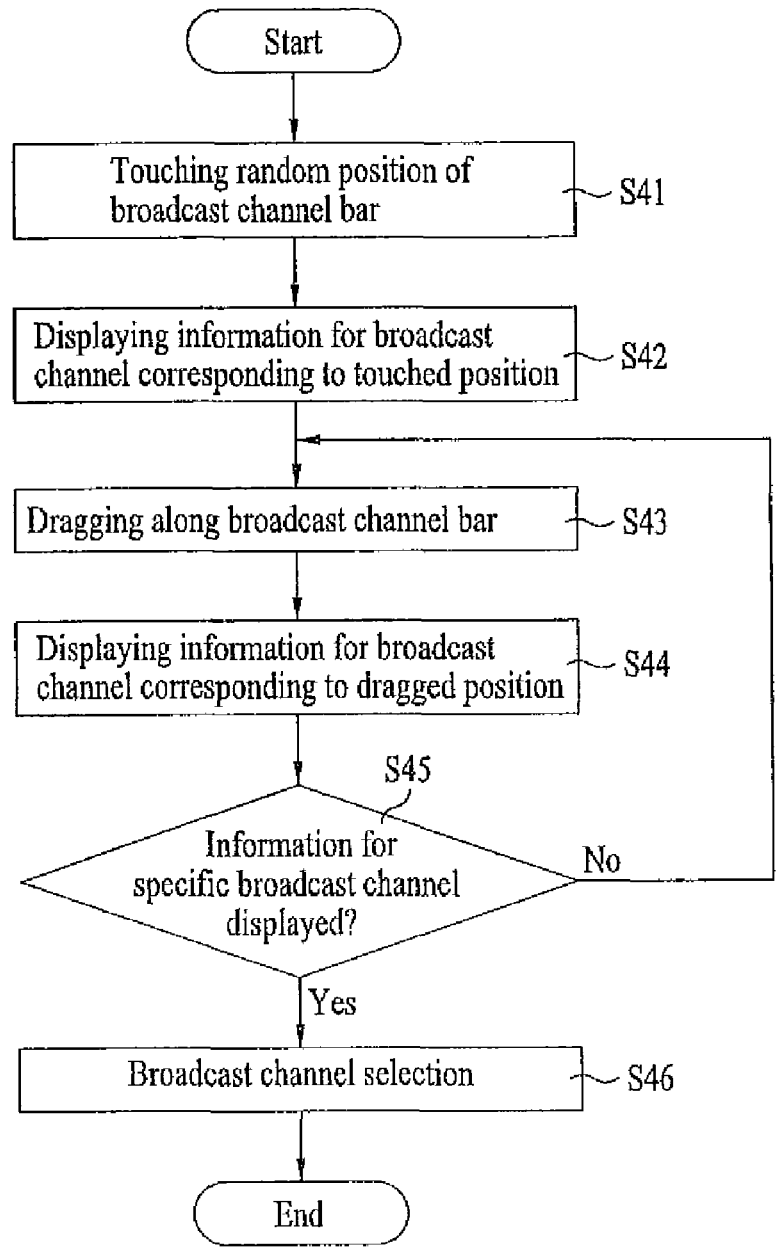
FIG. 4 is a flowchart of a method of displaying broadcast channel information according to a first embodiment of the present invention.

The user can also select a particular broadcast by maintaining the pointer on the particular broadcast for a predetermined amount of time (see (3-4) of FIG. 4), or by releasing the pointer from the particular broadcast (see (3-5) of FIG. 3).

Turning next to FIG. 4, which is a flowchart of a method of displaying broadcast channel information according to a first embodiment of the present invention. FIG. 3 will also be referred to in this description. As shown in FIG. 4, the user first touches a random part of the broadcast channel bar 310 using a pointer, e.g., a stylus pen, a finger, etc. (S41). Then, information about the broadcast channel assigned in advance to the touched part is displayed (S42). For example, as shown in (3-1) of FIG. 3, the user touches the second section (number 2 section) of the channel bar 310. In this instance, the information for the broadcast channel previously assigned to the second section is displayed. That is, the information indicates the broadcast channel is "SBS" and the title of the program is "Salt Doll" (a Korean drama).

Further, the displayed information can be only the name of the corresponding broadcast channel (e.g., 'SBS'). However, it is preferably to also display the title of a currently broadcasted broadcast program (i.e., 'Salt Doll (Part 9)') together with the name of the corresponding broadcast channel. Further, the title of the broadcast program can be obtained from a broadcast program guide received by the broadcast receiving unit 100.

Subsequently, the user drags the pointer along the broadcast channel bar 310 while continuously touching the broadcast channel bar 310 (S43). Then, information of the broadcast channels assigned in advance are sequentially displayed (S44). For instance, as shown in (3-2) of FIG. 3, the user 1 user drags the pointer to the third section (numeral 3) from the second section on the broadcast channel bar 310, and information for the broadcast channel assigned in advance to the third section is displayed. Thus, the user can easily search and view the corresponding broadcast channels by touching and dragging the pointer along the broadcast channel bar 310.

Then, in FIG. 4, the method determines if information is displayed for a particular broadcast channel (i.e., when the user is touching the particular broadcast channel) (S45). The method also selects or displays the broadcast program corresponding to the particular broadcast channel when the user maintains the pointer on the particular broadcast channel for a predetermined amount of time or releases the pointer from the particular broadcast channel (S46).

For instance, as shown in (3-3) of FIG. 3, when the user drags the pointer to the sixth section from the third section on the broadcast channel bar 310, information for the broadcast channels assigned in advance to the fourth, fifth and sixth sections is sequentially displayed (note for simplicity purposes, FIG. 3 does not illustrate the information being displayed for the fourth and fifth sections). Then, when the user desires to view the broadcast channel corresponding to the sixth section, the user can select the broadcast channel corresponding to the sixth section using one of the above two methods, for example.

In more detail, as shown in (3-4) of FIG. 3, the user can select the broadcast program corresponding to the sixth section by leaving the pointer at the sixth section for a prescribed duration. Alternatively, as shown in (3-5) of FIG. 3, the user can release the pointer from the sixth section to view the broadcast program. However, the selection of the broadcast channel is not limited to the above cases. For instance, the selection of the broadcast channel can be performed by inputting a prescribed command input into the input unit 500.

In the above description of the first embodiment, the information for each channel is sequentially displayed as the user touches and drags a pointer across the channel bar 310 without actual switching to the corresponding broadcast channels. However, it is also possible to actually display and switch to each broadcast channel as the user touches and drags the pointer across the channel bar 310. Further, it is also possible to display information about the broadcasting channels at the first and last touched positions, and not about broadcasting channels therebetween.

Second Embodiment

Figure 5:
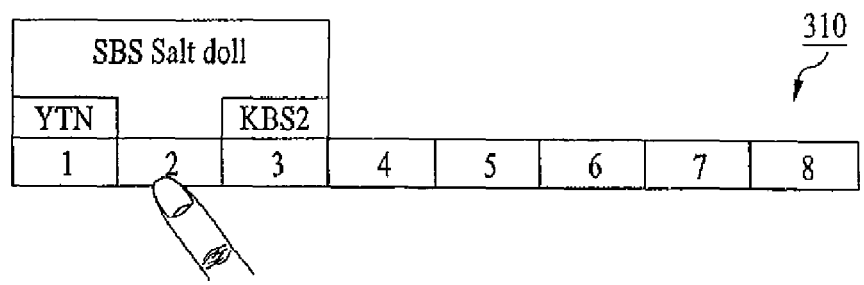
FIG. 5 is an overview of a channel part including a plurality of broadcast channels displayed on a touch screen of a mobile terminal according to a second embodiment of the present invention.
Figure 5:
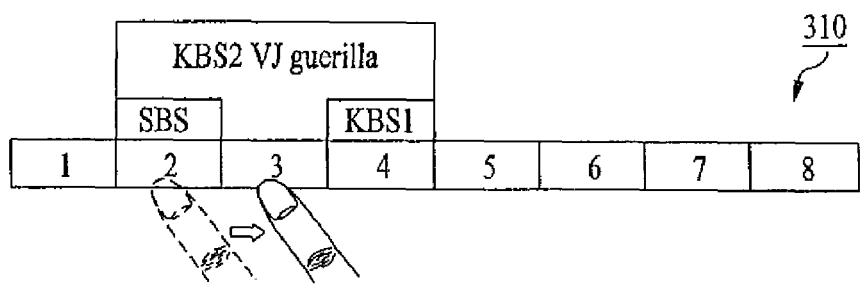
Figure 5:
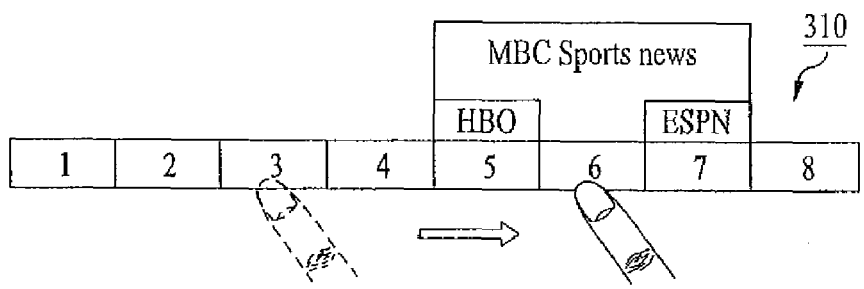

Turning next to FIG. 5, which is an overview of a channel part including a plurality of broadcast channels displayed on a touch screen of a mobile terminal according to the second embodiment of the present invention. Note that FIG. 5 differs from FIG. 3 in that as the pointer is dragged from the first position to the second position, the information about a broadcast channel currently touched by the pointer in addition to information about broadcast channels that are adjacent to the currently touched broadcasting channel are displayed.

In more detail, as shown in (5-1) of FIG. 5, the user touches a pointer to the second section of the broadcast channel bar 310. Then, information about the broadcast channel assigned to the second section is displayed as well as information for broadcast channels assigned to the sections adjacent to the second section (i.e., the first and third sections). Therefore, the user is able to obtain the information for a plurality of the broadcast channels by a single touch to the broadcast channel bar 310.

As shown in (5-2) of FIG. 5, when the user drags the touched pointer to the third section from the second section, the information for the broadcast channel assigned in advance to the third section is displayed as well as the information for the broadcast channels assigned in advance to the second and fourth sections.

Similarly, as shown in (5-3) of FIG. 5, when the user drags the pointer to the sixth section from the third section on the broadcast channel bar 310, the information for the broadcast channels assigned in advance to the third, fourth and fifth sections is displayed. Further, the information for each adjacent channel is also displayed as the user touches and drags the pointer across the channel bar 310. Then, if the user wants to view the broadcast channel corresponding to the sixth section, the user can select the broadcast channel corresponding to the sixth section via any of the selection methods discussed above with respect to the first embodiment.

Therefore, in the second embodiment, the information for the broadcast channels corresponding to the right and left sections of the touched section is displayed together with the information for the touched section. It is also possible to only display information for a section that is to the right (or left) of the touched section in addition to the touched section. It is also possible to display information for two sections, three sections, etc. in addition to information for the touched section.

Third Embodiment

Figure 6:
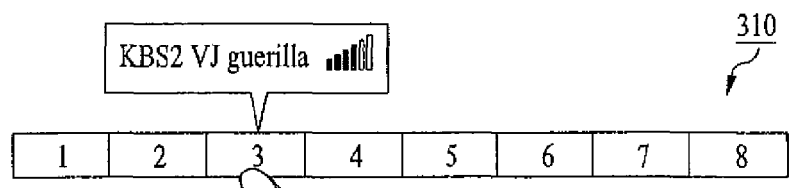
FIG. 6 is an overview of a channel part including a plurality of broadcast channels displayed on a touch screen of a mobile terminal according to a third embodiment of the present invention.
Figure 6:
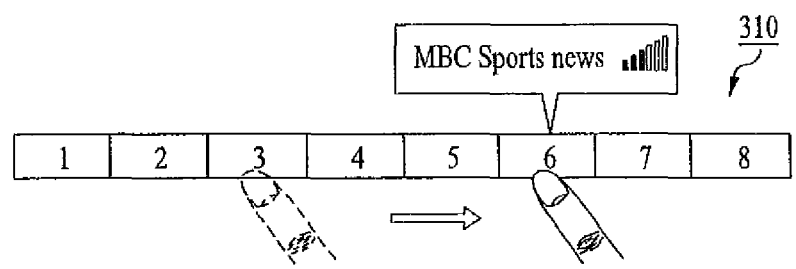
Figure 6:
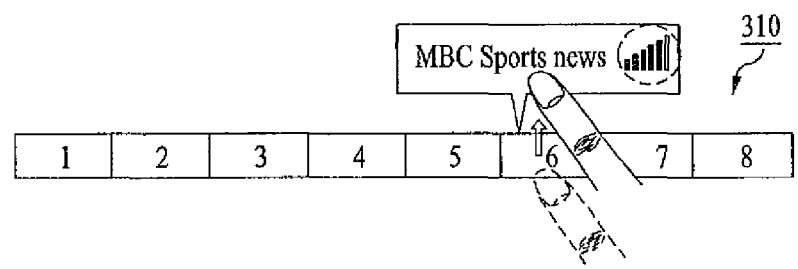
Figure 6:
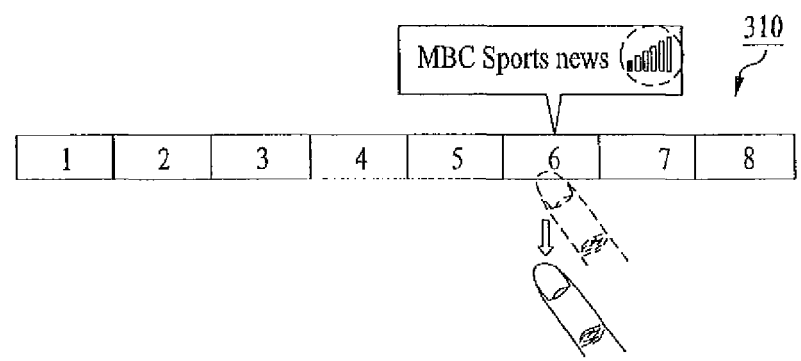

Next, FIG. 6 is an overview of a channel part including a plurality of broadcast channels displayed on a touch screen of a mobile terminal according to the third embodiment of the present invention. In this embodiment, information indicating a current volume level of the corresponding broadcast channel is also displayed with the information about the broadcast channel.

In more detail, as shown in (6-1) of FIG. 6, a terminal user touches the third section on the broadcast channel bar 310 using a pointer. If so, the information for a broadcast channel assigned in advance to the third section is displayed. In addition, the displayed information for the corresponding broadcast channel is configured to include a volume level set per each broadcast channel.

Referring to (6-2) of FIG. 6, when the user drags the pointer to the sixth section from the third section, the information for the broadcast channel corresponding to the sixth section and the volume level of the corresponding broadcast channel are displayed. In more detail, as shown in the comparison between (6-1) and (6-2) of FIG. 6, it can be seen that the volume levels of the broadcast channels are different from each other.

Further, as shown in (6-3) and (6-4) of FIG. 6, the user can set the volume level for each broadcasting channel. In more detail, as shown in (6-3) and (6-4) of FIG. 6, when the user is touching the sixth section with the pointer, the user can adjust the volume level for that particular broadcast channel by moving/dragging the pointer in a direction (e.g., the vertical direction in FIG. 6) different from the aligned direction (e.g., the horizontal direction in FIG. 6) of the broadcast channel bar 310.

That is, (6-3) of FIG. 6 illustrates the user dragging the pointer upwards to increase the volume level, and (6-4) of FIG. 6 illustrates the user dragging the pointer downwards to decrease the volume level. Therefore, the user can adjust the volume levels of the broadcast channels, respectively.

Fourth Embodiment

Figure 7:
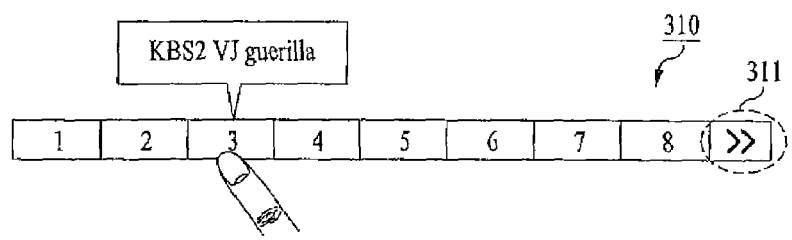
FIG. 7 is an overview of a channel part including a plurality of broadcast channels displayed on a touch screen of a mobile terminal according to a fourth embodiment of the present invention.
Figure 7:
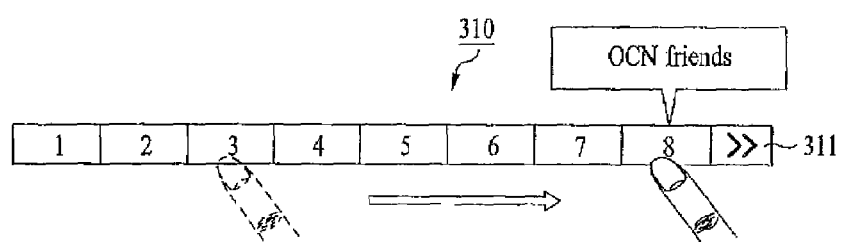
Figure 7:
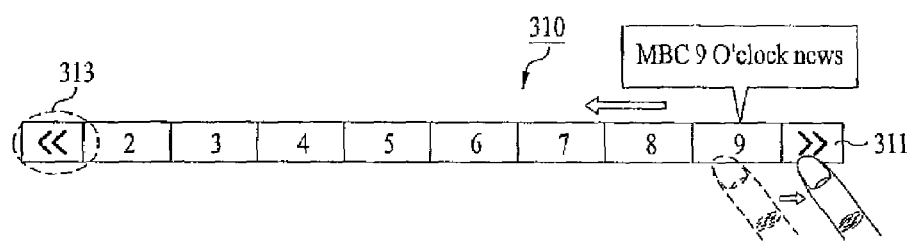
Figure 7:
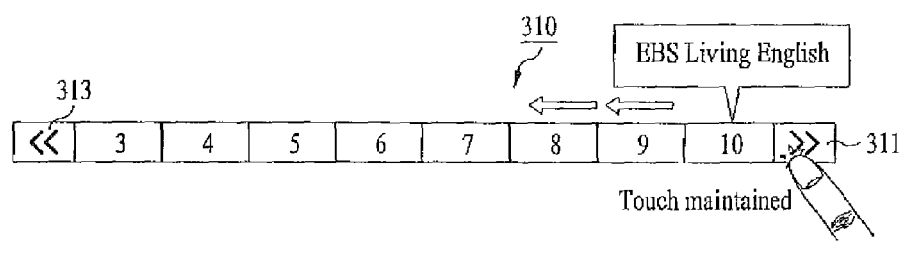

Turning next to FIG. 7, which is an overview of a channel part including a plurality of broadcast channels displayed on a touch screen of a mobile terminal according to the fourth embodiment of the present invention. In FIG. 7, scroll regions 311 are provided allowing the user to scroll the various broadcast channels.

In more detail, sometimes there are too many broadcast channels of the broadcast channel bar 310 to be displayed on the touch screen 300. Therefore, scroll regions 311 are provided on the broadcast channel bar 310. As shown in (7-1) of FIG. 7, the channel bar 310 displays only eight sections. Thus, the user can touch the next, indication 311, to view additional broadcast channels. That is, the indication 311 indicates to the user there are additional channels besides the displayed eight channels.

Thus, with reference to (7-1) and (7-2) of FIG. 7, when the user touches the pointer to the third section on the broadcast channel bar 310 and then drags the pointer to the eight section, the information for broadcast channels corresponding to the touched sections (i.e., the third to eighth sections) is sequentially displayed as discussed above.

As shown in (7-3) of FIG. 7, when the terminal user drags the pointer to the 'next' indication 311 via the eighth section, the broadcast channel bar 310 is moved in a direction opposite to the dragged direction. Therefore, the section located to the right of the eighth section of the broadcast channel bar (i.e., the ninth section) is displayed and the first section of the broadcast channel bar disappears. Further, as shown in (7-3) and (7-4) of FIG. 7, a 'previous' indication 313, which indicates that broadcast channel(s) exist to the left of the displayed broadcast channels.

Referring to (7-4) of FIG. 7, when the user maintains the pointer at the 'next' indication 311 for a predetermined duration, the broadcast channel bar 310 is moved in the direction opposite to the dragged direction to display the section next to the ninth section of the broadcast channel bar 310 (i.e., the tenth section is displayed and the second section of the broadcast channel bar 310 disappears).

Thus, the user is able to select a specific broadcast channel by scrolling through the entire broadcast channel bar. The user may select any one of the displayed broadcasting channels using the above-described methods.

In the above description of the fourth embodiment, the broadcast channel bar 310 is moved by one section when the 'next' or "previous" indication 311 and 313 is touched. However, at least two sections can also be simultaneously moved.

Fifth Embodiment

Figure 8:
FIG. 8 is an overview of a channel part including a plurality of broadcast channels displayed on a touch screen of a mobile terminal according to a fifth embodiment of the present invention.

Turning now to FIG. 8, which is an overview of a channel part including a plurality of broadcast channels displayed on a touch screen of a mobile terminal according to the fifth embodiment of the present invention. In FIG. 8, the user can scroll the channels shown on the channel bar 310 by dragging the pointer at a position above (or below) the channel bar 310. See (8-1), (8-2) and (8-3) in FIG. 8.

In more detail, the user may touch a pointer to a portion of the touch screen except the broadcast channel bar 310 (see 8-1 in FIG. 8), and then drag the pointer in a left direction (see 8-2 in FIG. 8) or in a right direction (see 8-3 in FIG. 8). The channels in the channel bar 310 are then scrolled in the same corresponding direction. Further, in one example, the moving range of the channels in the broadcast channel bar 310 is preferably proportional to length of the user dragging the pointer. Thus, the user is able to scroll through the different channels in the channel bar 310.

Accordingly, the present invention provides several advantages.

First, when the user performs a touch and drag action on the touch screen, information for a plurality of broadcast channels is sequentially displayed in response to the touch and drag action. Hence, the user can easily search for a specific broadcast channel among a plurality of broadcast channels.

Secondly, the displayed information for the broadcast channels includes broadcast program information such as a broadcast program title obtained from a broadcast program guide. Hence, this information helps the user to easily search for a desired broadcast channel.

Thirdly, the volume level of each broadcast channel is displayed and adjustable. Hence, the user is able to listen to a corresponding broadcast channel by varying the volume level according to each broadcast channel.

Fourthly, although a broadcast receiver is capable of receiving a number of broadcast channels exceeding a display capability of a touch screen, the present invention facilitates a terminal user to find a specific one of the broadcast channels.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcast terminal comprising:
   a broadcast receiving unit;
   a touch screen; and
   a control unit configured to enter a broadcasting mode for receiving broadcast programs, to display a broadcast channel bar on the touch screen without displaying broadcast channel information about any broadcast channels, the broadcast channel information including at least a broadcast channel name, and then to sequentially display the broadcast channel information about first and second broadcast channels as a pointer is touched at a first position corresponding to the first broadcast channel and dragged to a second position corresponding to the second broadcast channel in a first direction on the touch screen,
   wherein the broadcast channel bar includes the first and second positions corresponding to the first and second broadcast channels and the pointer is dragged on the broadcast channel bar,
   wherein the broadcast channel bar is arranged in the first direction,
   wherein a plurality of broadcast channels including the first and second broadcast channels at the first and second positions are assigned in advance to a plurality of sections of the broadcast channel bar, respectively,
   wherein the control unit is further configured to, when the pointer is dragged at each section in a second direction perpendicular to the first direction, adjust a volume of a corresponding broadcast channel to the each section, and
   wherein a volume level only for a specific broadcast channel corresponding to a specific section touched by the pointer is displayed simultaneously together with a specific broadcast channel name of the specific broadcast channel.

2. The broadcast terminal of claim 1, wherein when the pointer stays at the second position for a prescribed duration, the control unit is further configured to switch to the second broadcast channel at the second position.

3. The broadcast terminal of claim 1, wherein when the pointer is released from the second position, the control unit is further configured to switch to the second broadcast channel at the second position.

4. The broadcast terminal of claim 1, wherein at least one specific broadcast channel selected by a user is only assigned in advance to the plurality of sections of the broadcast channel bar.

5. The broadcast terminal of claim 1, wherein as the pointer is dragged from the first position to the second position, the control unit is further configured to display broadcast channel information about a broadcast channel corresponding to a section currently touched by the pointer in addition to additional broadcast channel information about broadcast channels corresponding to sections that are only directly adjacent to the currently touched section.

6. The broadcast terminal of claim 1,
   wherein the broadcast channel bar is displayed in a manner of being visually discriminated according to a feature of the broadcast channel assigned to each of a plurality of the sections.

7. The broadcast terminal of claim 6, wherein the broadcast channel bar is discriminated by a color according to the feature of each of the plurality of the broadcast channels.

8. The broadcast terminal of claim 1, wherein the broadcast channel information further comprises a title of a broadcast program currently broadcasted on the corresponding broadcast channel.

9. The broadcast terminal of claim 1, wherein when the pointer is dragged out of a prescribed range on the broadcast channel bar, the control unit is further configured to move the broadcast channel bar in a direction opposite to that of dragging the pointer.

10. The broadcast terminal of claim 1, wherein even though at least one broadcast channel is assigned between the first and second positions corresponding to the first and second broadcast programs, the controller is further configured to display information only about the first and second broadcast channels respectively assigned in advance to the first and second positions.

11. The broadcast terminal of claim 1, wherein the controller is further configured to display the broadcast channel information about the first and second broadcast channels respectively assigned in advance to the first and second positions on the touch screen, sequentially in synchronization with the position of the pointer.

12. A method of displaying broadcast channel information on a broadcast terminal, the method comprising:
    entering a broadcasting mode for receiving broadcast programs;
    displaying a broadcast channel bar on a touch screen of the mobile terminal without displaying broadcast channel information about any broadcast channels, the broadcast channel information including at least a broadcast channel name;
    touching a pointer at a first position on the touch screen corresponding to a first broadcast channel and then dragging the pointer to a second position on the touch screen corresponding to a second broadcast channel in a first direction; and
    sequentially displaying the broadcast program channel information about the first and second broadcast channels while the pointer is dragged from the first position to the second position,
    wherein the broadcast channel bar includes the first and second positions corresponding to the first and second broadcast channels and the pointer is dragged on the broadcast channel bar,
    wherein the broadcast channel bar is arranged in the first direction,
    wherein a plurality of broadcast channels including the first and second broadcast channels at the first and second positions are assigned in advance to a plurality of sections of the broadcast channel bar, respectively,
    wherein a volume of a corresponding broadcast channel to the each section is adjusted by dragging the pointer at the each section in a second direction perpendicular to the first direction, and
    wherein a volume level only for a specific broadcast channel corresponding to a specific section touched by the pointer is displayed simultaneously together with a specific broadcast channel name of the specific broadcast channel.

13. The method of claim 12, further comprising switching to the second broadcast channel at the second position when the pointer stays at the second position for a prescribed duration.

14. The method of claim 12, further comprising switching to the second broadcast channel at the second position when the pointer is released from the second position.

15. The method of claim 12, wherein at least one specific broadcast channel selected by a user is only assigned in advance to the plurality of sections of the broadcast channel bar.

16. The method of claim 12, wherein the displaying step further comprises, as the pointer is dragged from the first position to the second position, displaying broadcast channel information about a broadcast channel corresponding to a section currently touched by the pointer in addition to additional broadcast channel information about broadcast channels corresponding to sections that are only directly adjacent to the currently touched section.

17. The method of claim 12,
wherein the broadcast channel bar is displayed in a manner of being visually discriminated according to a feature of the broadcast channel assigned to each of a plurality of the sections.

18. The method of claim 12, wherein the broadcast channel information further comprises a title of a broadcast program currently broadcasted on the corresponding broadcast channel.

19. The method of claim 12, wherein the broadcast channel information about the first and second broadcast channels respectively assigned in advance to the first and second positions on the touch screen is displayed sequentially in synchronization with the position of the pointer.

* * * * *